(No Model.)

W. J. ORMSBY.
LOOSE PULLEY LUBRICATOR.

No. 332,552.  Patented Dec. 15, 1885.

WITNESSES:
Robert Kirk
Dugald McKillop

INVENTOR:
William J. Ormsby
By J. S. Zerbe
Attorney.

UNITED STATES PATENT OFFICE.

WILLIAM J. ORMSBY, OF CINCINNATI, OHIO.

LOOSE-PULLEY LUBRICATOR.

SPECIFICATION forming part of Letters Patent No. 332,552, dated December 15, 1885.

Application filed May 29, 1885. Serial No. 167,029. (No model.)

*To all whom it may concern:*

Be it known that I, WILLIAM J. ORMSBY, of Cincinnati, in the county of Hamilton and State of Ohio, have invented a new and useful Improvement in Loose-Pulley Lubricators, which improvement is fully set forth in the following specification and accompanying drawings, in which—

Figures 1, 2:
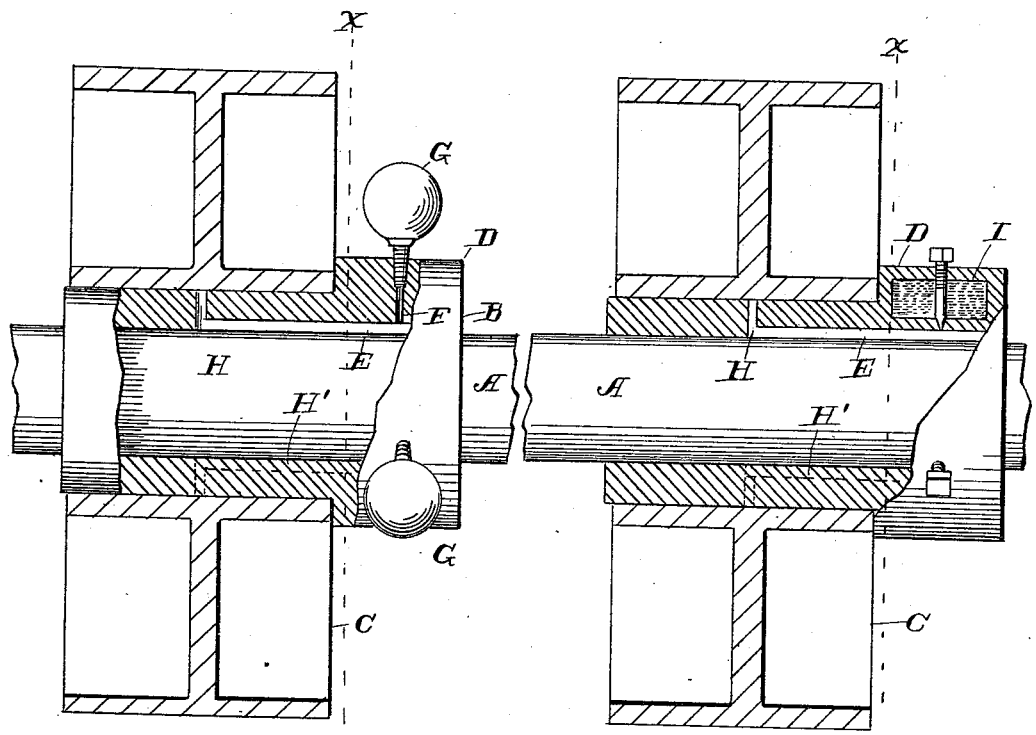

Figure 1 is a vertical central section of my improved loose pulley lubricator. Fig. 2 is a section of the same, showing a modification; and Fig. 3, a cross view in section at line $x$.

The present invention relates to an improvement in the class of articles known as "lubricators," wherein a sleeve having thereon at one end a pulley is provided on its inner surface with a circumferential reservoir, and has a series of ducts at one end, having therein the usual oil-cups, and another series of cups to convey the oil to the central surface of the pulley in contact with the shell, all of which will now be fully set forth.

Figure 3:
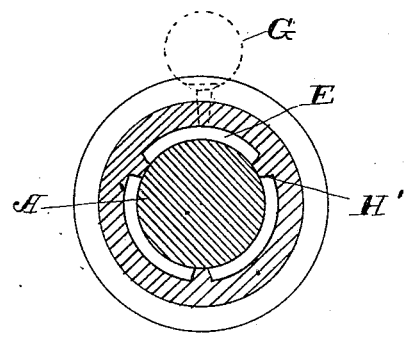

In the accompanying drawings, A is an ordinary shaft, having thereon a shell or sleeve, B, one end of the said sleeve being provided with a pulley, C, so disposed as to revolve thereon. The part of the sleeve projecting from beneath the pulley-hub is somewhat enlarged, forming an annular head, D. The inner central part of the sleeve B is provided with an annular reservoir or duct, E. The head D is provided with a series of ducts, F, preferably three in number, said ducts communicating with the annular reservoir or duct E. These ducts F are provided with oil-cups G, which act as feeders for the ducts and reservoir E. The part of the annular reservoir beneath the hub of the pulley C is also provided with ducts H, leading from the said reservoir, so as to convey oil to the hub of the pulley revolving upon the said sleeve. These ducts H are preferably designed to be placed at such a position in the sleeve that they will connect with the central part of the pulley, so as to oil evenly laterally. By cutting away the inner central portion of the sleeve to form the annular reservoir the periphery of the said sleeve may be somewhat weakened. To counteract this tendency, I provide a series of strengthening-ribs, H', between the ducts F and H, preferably three in number, and alternating somewhat with the ducts F, as shown in Fig. 3.

Fig. 2 shows a modification of the device as described in Fig. 1, wherein, instead of simply ducts F within the annular head being within the oil-cups G, the inner ends of said ducts F are enlarged, so as to form an annular reservoir, I, supplementary to the annular reservoir or duct E, and the oil is supplied from the reservoir I by means of the screws, as shown in my former patent.

In operation the oil from the cups G, passing downwardly through the ducts F and into the reservoir E, passes outwardly through the ducts H beneath to the periphery of the sleeve to the pulley H, and thence spreads laterally by the revolution of the pulley.

What I claim is—

1. In a loose-pulley lubricator, a shell or sleeve securely attached to the shaft, and having centrally on the inner side an annular reservoir or duct opening into its inner face, communicating by means of a series of ducts at one end with the oil-cups, and at the other, by means of ducts, with the periphery of the sleeve beneath the pulley, substantially as herein set forth.

2. A loose-pulley lubricator consisting of a shell or sleeve securely attached to the shaft, and provided on its inner face with annular reservoirs or ducts formed at opposite ends, with ducts to communicate with the oil-cups and the pulley and with the shaft, substantially as herein set forth.

3. The combination of the sleeve attached to the shaft, provided on its inner face with an annular reservoir or duct provided at one end with a series of oil-cups and at the opposite end with ducts communicating with the pulley, with the oil-cups G, the pulley C, and the shaft A, the whole arranged as and for the purpose substantially as herein set forth and described.

In testimony that I claim the foregoing I have hereunto set my hand, this 13th day of May, 1885, in the presence of witnesses.

WILLIAM J. ORMSBY.

Witnesses:
J. S. ZERBE,
C. D. ZERBE.